United States Patent
Chen et al.

(10) Patent No.: US 8,525,918 B2
(45) Date of Patent: Sep. 3, 2013

(54) PORTABLE ELECTRONIC DEVICES AND AUTO-FOCUS CONTROL METHODS FOR CAMERAS THEREIN

(75) Inventors: Li-Yin Chen, Taoyuan County (TW); Chun-Ta Lin, Taoyuan County (TW); Yi-Tsung Cheng, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 104 days.

(21) Appl. No.: 13/090,457

(22) Filed: Apr. 20, 2011

(65) Prior Publication Data
US 2012/0268645 A1 Oct. 25, 2012

(51) Int. Cl.
*H04N 5/232* (2006.01)

(52) U.S. Cl.
USPC ........... 348/345; 348/346; 348/347; 348/348; 348/349; 348/350; 348/351; 348/352; 348/353; 348/354; 348/355; 348/356; 348/357

(58) Field of Classification Search
USPC .............................. 348/345, 346–357; 396/72
See application file for complete search history.

(56) References Cited

U.S. PATENT DOCUMENTS

| | | | |
|---|---|---|---|
| 2005/0281169 A1* | 12/2005 | Kimura et al. | 369/112.01 |
| 2007/0133967 A1* | 6/2007 | Takahashi et al. | 396/55 |
| 2008/0031609 A1* | 2/2008 | Rukes | 396/89 |
| 2008/0180563 A1* | 7/2008 | Hsu | 348/349 |

* cited by examiner

*Primary Examiner* — Roberto Velez
*Assistant Examiner* — Yih-Sien Kao
(74) *Attorney, Agent, or Firm* — Birch, Stewart, Kolasch & Birch, LLP

(57) ABSTRACT

A portable electronic device and an autofocus control method of a camera of the portable electronic device are disclosed. The portable electronic device provides a G-sensor to detect the orientation of the portable electronic device, and provides a storage unit to store autofocus lookup tables for different orientations of the portable electronic device, respectively. According to orientation information from the G-sensor, the central processing unit of the portable electronic device selects one autofocus lookup table from the storage unit and thereby generates an actuating signal for a focus model. The focus model of the portable electronic device is actuated by the actuating signal to adjust an image distance between a lens module and an image sensor of the camera.

4 Claims, 3 Drawing Sheets

PORTABLE ELECTRONIC DEVICES AND AUTO-FOCUS CONTROL METHODS FOR CAMERAS THEREIN

BACKGROUND OF THE INVENTION

1. Field of the Invention

The present invention relates to portable electronic devices, and in particular relates to auto-focus control methods for the cameras thereof.

2. Description of the Related Art

Camera apparatuses nowadays are generally equipped with auto focus functions.

For portable electronic devices, such as a mobile phone or a PDA having cameras therein, or a camera and so on, the auto-focus accuracy of the camera apparatus therein is dependent on the way a user holds the portable electronic device.

In this auto focus field, improving the auto focus quality of cameras of portable electronic devices is important.

BRIEF SUMMARY OF THE INVENTION

A portable electronic device and an auto focus method for cameras therein are disclosed.

A portable electronic device in accordance with an exemplary embodiment of the invention comprises one lens module, an image sensor, a G-sensor, a storage unit, a central processing unit and a focus module.

There is an image distance between the lens module and the image sensor. The G-sensor detects the orientation of the portable electronic device to generate orientation information. The storage unit stores autofocus look up tables for different orientations of the portable electronic device, respectively. According to the orientation information, the central processing unit selects one of the autofocus look up tables from the storage unit and generates an actuating signal for the focus module based on the selected autofocus look up table. Driven by the actuating signal, the focus module adjusts the image distance.

According to an exemplary embodiment of the invention, an autofocus method for a camera of a portable electronic device is disclosed and comprises the following steps: providing autofocus look up tables for different orientations of a portable electronic device, respectively; detecting the orientation of the portable electronic device to generate orientation information; selecting one of the autofocus look up tables according to the orientation information, and generates an actuating signal for an focus module based on the selected autofocus look up table; and driving the focus module according to the actuating signal to adjust an image distance between a lens module and an image sensor of the camera.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
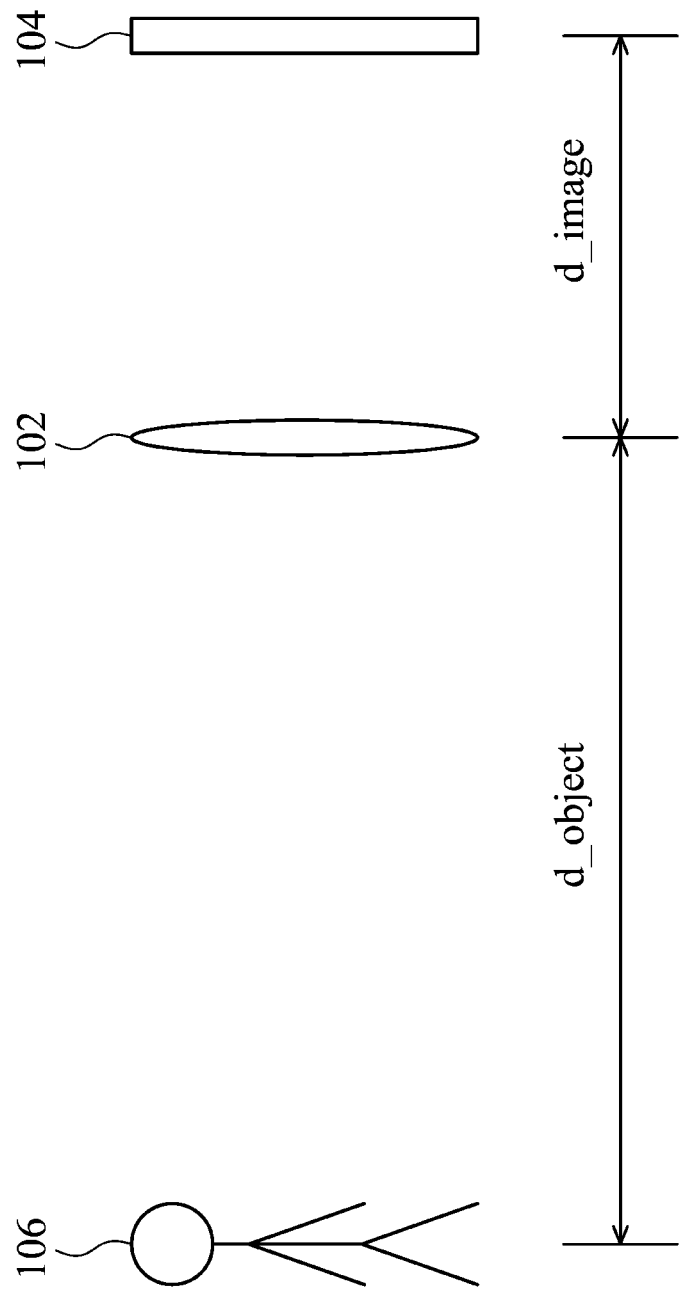
FIG. 1 is depicted to define an autofocus function for a camera apparatus.
Figure 2:
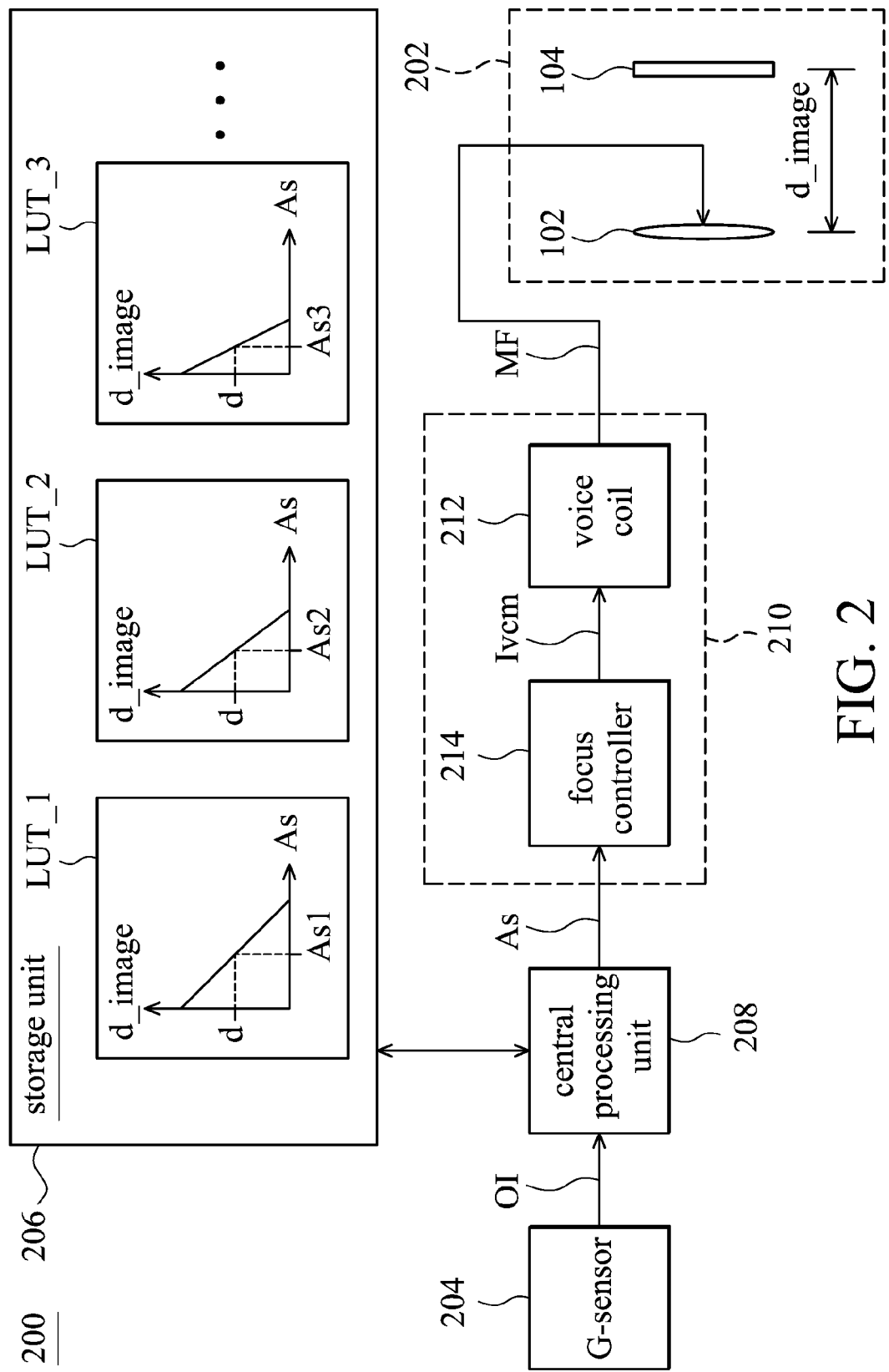
FIG. 2 shows a block diagram illustrating an exemplary embodiment of a portable electronic device of the invention.

FIG. 1 is depicted to define an autofocus function for a camera apparatus. As shown, a lens module and an image sensor of a camera are numbered 102 and 104, respectively, while one object to be captured is numbered 106. In this figure, the lens module 102 is illustrated as a lens. The image sensor 104 may be implemented by a CCD array, a CMOS array or other photo sensor module. The distance between the lens module 102 and the image sensor 104 may be defined as an image distance d_image. The distance between the lens module 102 and the object 106 to be captured may be defined as an object distance d_object. An autofocus function may adjust the image distance d_image based on the object distance d_object to capture a clear image. FIG. 2 shows a block diagram illustrating a portable electronic device in accordance with an exemplary embodiment of the invention, which provides a desirable autofocus function.

Referring to FIG. 2, a camera 202 of a portable electronic device 200 comprises the aforementioned lens module 102 and the image sensor 104. As shown, there is an image distance d_image between the lens module 102 and the image sensor 104. Further, the portable electronic device 200 comprises a G-sensor 204, a storage unit 206, a central processing unit 208 and a focus module 210. The G-sensor 204 detects the orientation of the portable electronic device 200 to generate orientation information OI. The storage unit 206 stores a plurality of autofocus look up tables, LUT_1, LUT_2 and LUT_3 or more, for different orientations of the portable electronic device 200. Based on the orientation information OI, the central processing unit 208 selects one of the autofocus look up tables from the storage unit 206, and generates an actuating signal As based on the selected autofocus look up table. The focus module 210, actuated by the actuating signal As, adjusts the image distance d_image between the lens module 102 and the image sensor 104.

As shown in the embodiment of FIG. 2, the focus module 210 comprises a voice coil 212 and a focus controller 214. Based on a driving current Ivcm, the voice coil 212 generates a magnetic force MF to move the lens module 102 and thereby adjust the image distance d_image. The focus controller 214 is configured to generate the driving current Ivcm, based on the actuating signal As from the central processing unit 208, to drive the voice coil 212.

It is noted that the orientation of the lens module 102 of the camera 202 changes with the orientation of the portable electronic device 200. That is, gravity should be taken into consideration in focus control. The following discussion is shown in contrast to a case where the lens module 102 faces forward. When the lens module 102 faces upward, a greater magnetic force MF is required to further support the lens module 102 because of gravity. When the lens module 102 faces downward, less magnetic force MF is required because the weight of the lens module 102 pushes outward.

The multiple autofocus look up tables LUT_1, LUT_2 and LUT_3 stored in the storage unit 206 are configured to manage the influence of gravity on the autofocus function. In this embodiment, the autofocus look up tables LUT_1, LUT_2 and LUT_3 relate to different orientations (e.g. 3 different orientations), and, each table provides one mapping table of the actuating signal As to the image distance d_image, as discussed in more detail below.

The first autofocus look up table LUT_1 relates to a case where the lens module 102 faces upward, and shows a mapping table, between the actuating signal As and the image distance d_image. The second autofocus look up table LUT_2 relates to a case where the lens module 102 faces forward, and shows a mapping table, between the actuating signal As and the image distance d_image. The third autofocus look up table LUT_3 relates to a case where the lens module 102 faces downward, and shows a mapping table, between the actuating signal As and the image distance d_image. For consistent control of the image distance d_image— for example, controlling the image distance d_image to be a specific value—the first autofocus look up table LUT_1 outputs a first actuating signal As1 which is greater than a second actuating signal As2 determined by the second autofocus look up table LUT_2, and, the second actuating signal As2 is greater than a third actuating signal As3 determined by the third autofocus table LUT_3. That is, As1>As2>As3. Because of the different actuating signals As1, As2 and As3, the focus controller 214 generates different driving currents (Ivcm) to drive the voice coil 212 to generate different magnetic forces (MF) to appropriately cope with different orientations of the lens module 102.

Note that other embodiments may use more autofocus look up tables if more orientations of the lens module are taken into consideration for autofocus control. The number of the autofocus look up tables is not limited to 3 (as in the case shown in FIG. 2). The autofocus look up tables may be stored in the storage unit 206 when manufactured.

Furthermore, in other embodiments, the focus module 210 may be implemented by other techniques and is not limited to the voice coil technique shown in FIG. 2. Any drive mechanism for a lens module may be implemented as the focus module 210.

Furthermore, the disclosed portable electronic device may be any portable device having camera functions. For example, a mobile phone or a PDA, or a camera for photography use, a video camera, and so on.

Figure 3:
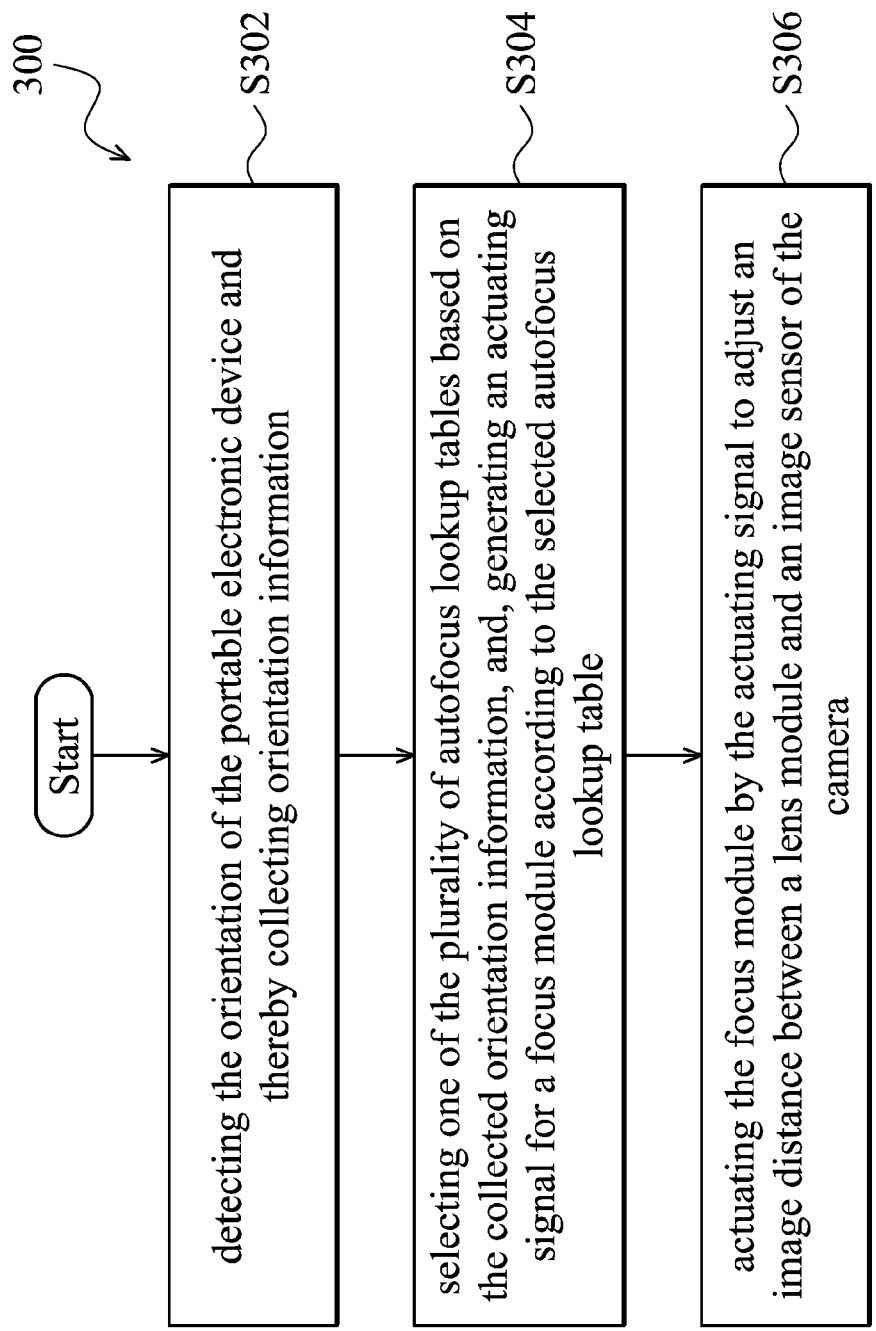
FIG. 3 shows a flowchart depicting an autofocus method for a camera of a portable electronic device according to the present invention.

In addition to the disclosed portable electronic devices, FIG. 3 shows a flowchart illustrating an autofocus method that is configured to cameras of the portable electronic devices. The autofocus procedure 300 is specially designed to use the multiple autofocus look up tables (e.g. the autofocus look up tables LUT_1, LUT_2 and LUT_3 stored in the disclosed storage unit 206) for different orientations of the portable electronic device, and, the method includes steps S302-S306. In step S302, the orientation of the portable electronic device is detected and thereby orientation information is collected. In step S304, one of the plurality of autofocus lookup tables is selected based on the collected orientation information, and, an actuating signal for a focus module is generated according to the selected autofocus lookup table. In step S306, the focus module is actuated by the actuating signal to adjust an image distance between a lens module and an image sensor of the camera.

In one embodiment, the focus module may be implemented by a voice coil mechanism. That is, in step S306, a driving current may be generated based on the actuating signal to drive a voice coil to provide a magnetic force to shift the lens module and thereby adjust the image distance.

Note that the steps taken by the disclosed autofocus procedure are not limited for operation of the device of FIG. 2. Any autofocus method for cameras in portable electronic devices may be considered once they use the disclosed steps.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device, comprising:
   a lens module;
   a photo sensor, wherein, there is an image distance between the photo sensor and the lens module;
   a G-sensor, detecting an orientation of the portable electronic device and thereby generating orientation information;
   a storage unit, storing a plurality of autofocus look up tables for different orientations of the portable electronic device;
   a central processing unit, selecting one of the plurality of autofocus look up tables based on the orientation information and generating an actuating signal based on the selected autofocus look up table; and
   a focus module, actuated by the actuating signal to adjust the image distance,
   wherein:
   the orientation information generated by the G-sensor shows that the lens module is facing upward, forward or downward; and
   the plurality of lookup tables stored in the storage unit comprises:
      a first autofocus lookup table, providing a mapping table of the actuating signal to the image distance in a case where the lens module is facing upward;
      a second autofocus lookup table, providing a mapping table of the actuating signal to the image distance in a case where the lens module is facing forward; and
      a third autofocus lookup table, providing a mapping table of the actuating signal to the image distance in a case where the lens module is facing downward,
   wherein, to control the image distance to be a specific value, the first autofocus look up table outputs a first actuating signal which is greater than a second actuating signal determined by the second autofocus look up table, and, the second actuating signal is greater than a third actuating signal determined by the third autofocus table.

2. The portable electronic device as claimed in claim 1, wherein the focus module comprises:
   a voice coil, generating a magnetic force according to a driving current to move the lens module and thereby adjust the image distance; and
   a focus controller, generating the driving current, according to the actuating signal generated by the central processing unit, to drive the voice coil.

3. An autofocus method for a camera of a portable electronic device, comprising:
   providing a plurality of autofocus look up tables for different orientations of the portable electronic device;
   detecting an orientation of the portable electronic device and thereby generating orientation information;
   selecting one of the plurality of autofocus look up tables based on the orientation information, and generating an actuating signal based on the selected autofocus look up table; and actuating a focus module by the actuating signal to adjust an image distance between a photo sensor and a lens module of the camera, wherein:

the orientation information shows that the lens module is facing upward, forward or downward; and the plurality of lookup tables comprises:

a first autofocus lookup table, providing a mapping table of the actuating signal to the image distance in a case where the lens module is facing upward;

a second autofocus lookup table, providing a mapping table of the actuating signal to the image distance in a case where the lens module is facing forward; and a third autofocus lookup table, providing a mapping table of the actuating signal to the image distance in a case where the lens module is facing downward, wherein, to control the image distance to be a specific value, the first autofocus look up table outputs a first actuating signal which is greater than a second actuating signal determined by the second autofocus look up table, and, the second actuating signal is greater than a third actuating signal determined by the third autofocus table.

4. The method as claimed in claim 3, further comprising:

providing a voice coil, wherein, the voice coil generates a magnetic force according to a driving current to move the lens module and thereby adjust the image distance; and generating the driving current according to the actuating signal to drive the voice coil.

\* \* \* \* \*